No. 731,578. Patented June 23, 1903.

UNITED STATES PATENT OFFICE.

RENÉ KOEHLER, OF LYONS-MONPLAISIR, FRANCE.

SOLID SOLUBLE ANTISEPTIC.

SPECIFICATION forming part of Letters Patent No. 731,578, dated June 23, 1903.

Application filed March 23, 1903. Serial No. 149,200. (No specimens.)

*To all whom it may concern:*

Be it known that I, RENÉ KOEHLER, a citizen of France, residing at Lyons-Monplaisir, France, have invented a new and useful Solid Soluble Antiseptic, of which the following is a full, clear, and exact description.

It is known that formic aldehyde is at present frequently employed as an antiseptic and disinfectant. Nevertheless the commercial form in which it is utilized—viz., a solution in water of forty per cent.—constitutes an obstacle to the general employment of this excellent antiseptic. In effect, the liquid form of the product presents inconveniences for transport. It is not practicable for consumers to verify the tenor of the solution in formic aldehyde, and, further, this solution itself changes in character and polymerises, so that it is difficult and scarcely practical to ascertain the composition of the substance being used.

According to this invention a solid product can be obtained which is perfectly soluble in water and which in dissolving furnishes formic aldehyde at the precise strength it is desired to obtain and which has no longer the above-mentioned inconveniences. This solid substance is obtained by mixing trioxymethylene with sulfite of soda. Trioxymethylene, which is insoluble in water, is soluble in solutions of sulfite of soda and furnishes liquors which have all the antiseptic properties of solutions of formol. Only very small quantities of sulfite are necessary to insure the solution of trioxymethylene. For example, the mixture of ninety-five parts of trioxymethylene and five parts of sulfite of soda will dissolve in water to the extent of fifteen per cent. By increasing the proportion of sulfite the solubility of the trioxymethylene is also increased. This mixture of sulfite and of trioxymethylene may be employed alone or mixed with other antiseptic substances, so as to furnish mixed antiseptics, or, further, they may be mixed with coloring-matters, perfumes, or other accessory products. It may also be agglomerated in the form of tablets or other compressed forms.

Having fully described my invention, what I claim, and desire to secure by Letters Patent, is—

A mixture of trioxymethylene and sulfite of soda to be used as an antiseptic, deodorizer, disinfectant and antiferment, substantially as herein set forth.

In witness whereof I have hereunto set my hand in presence of two witnesses.

RENÉ KOEHLER.

Witnesses:
 GASTON JEANNIAUX,
 MARIN VACHOW.